(12) United States Patent
Richardson et al.

(10) Patent No.: US 11,612,023 B2
(45) Date of Patent: Mar. 21, 2023

(54) WIRELESS VEHICLE LIGHTING

(71) Applicant: Honda Motor Co., Ltd., Tokyo (JP)

(72) Inventors: Kathryn A. Richardson, Powell, OH (US); Nichole A. Verwys, Marysville, OH (US); Thomas G. Kracker, Marysville, OH (US); Duane Trent Detwiler, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/232,916

(22) Filed: Apr. 16, 2021

(65) Prior Publication Data

US 2021/0329753 A1    Oct. 21, 2021

Related U.S. Application Data

(60) Provisional application No. 63/011,514, filed on Apr. 17, 2020.

(51) Int. Cl.
*H05B 33/12*        (2006.01)
*H02J 50/10*        (2016.01)
(Continued)

(52) U.S. Cl.
CPC .......... *H05B 33/12* (2013.01); *B60Q 1/0088* (2013.01); *G09F 13/22* (2013.01); *H02J 50/10* (2016.02);
(Continued)

(58) Field of Classification Search
None
See application file for complete search history.

(56) References Cited

U.S. PATENT DOCUMENTS 9,248,778 B2    2/2016   Ford
9,466,988 B2    10/2016  Deyaf et al.
(Continued)

FOREIGN PATENT DOCUMENTS

CN    208670841 U    3/2019
CN    109838745 A    6/2019
(Continued)

OTHER PUBLICATIONS

James E. Gaskin. "Nikola Labs and the Race for Wireless IoT Power," IoT Playbook, May 10, 2018. https://www.iotplaybook.com/article/nikola-labs-and-race-wireless-iot-power.
(Continued)

*Primary Examiner* — Ashok Patel
(74) *Attorney, Agent, or Firm* — Rankin, Hill & Clark LLP (57) ABSTRACT

A flexible, sheet-like, multi-layered lighting assembly for applying to a surface. The lighting assembly includes an on-board power source for powering the lighting assembly. The lighting assembly includes a sheet-like electroluminescent light source that is activated by power from the power source, and when activated, emits light. The power source may include a flexible thin sheet-like battery, a wireless power receiver, or a combination thereof. The wireless power receiver may receive power from a power signal generated by a wireless power transmitter; and may operate to directly power the electroluminescent light source, or may recharge the battery. The lighting assembly includes outer and inner polymer layers for protecting the other layers of the lighting assembly, and an adhesive layer on the inner polymer layer for adhering the lighting assembly to a surface.

13 Claims, 3 Drawing Sheets

(51) Int. Cl.
    *G09F 13/22*         (2006.01)
    *H04B 5/00*          (2006.01)
    *B60R 16/03*        (2006.01)
    *B60Q 1/00*         (2006.01)

(52) U.S. Cl.
    CPC ....... *H04B 5/0037* (2013.01); *B60Q 2900/30* (2013.01); *B60R 16/03* (2013.01)

(56) References Cited

U.S. PATENT DOCUMENTS

| | | |
|---|---|---|
| 10,004,128 B2 | 6/2018 | Recker et al. |
| 10,101,018 B2 | 10/2018 | Medina Luna |
| 2003/0026103 A1 | 2/2003 | Reese et al. |
| 2011/0121957 A1 | 5/2011 | Podd et al. |
| 2016/0355124 A1 | 12/2016 | Cervantes Guarneros et al. |
| 2018/0009369 A1 | 1/2018 | Badkin |
| 2018/0020513 A1 | 1/2018 | Perez-Bolivar et al. |

FOREIGN PATENT DOCUMENTS

| | | | |
|---|---|---|---|
| JP | 2014-085640 | * | 5/2014 |
| KR | 20160123742 A | | 10/2016 |
| KR | 20180033510 | * | 4/2018 |

OTHER PUBLICATIONS

Nikola Technology Group—Power the Future, Nikola Labs, Inc., 2021. https://www.nikola.tech/ntg.

* cited by examiner

WIRELESS VEHICLE LIGHTING

CROSS REFERENCE TO RELATED APPLICATION

This application claims priority to U.S. Provisional Patent Application Ser. No. 63/011,514 filed Apr. 17, 2020, which is expressly incorporated herein by reference.

BACKGROUND

Typical vehicle lighting fixtures require a housing to contain the fixture, and a wire harness to provide power to the fixture. The housing and wire harness limit the locations in and on the vehicle where the lighting fixture can be installed, and make it difficult for after-market modification and customization of the lighting of a vehicle.

BRIEF DESCRIPTION

According to one aspect, a flexible lighting assembly for applying to an associated surface is provided. The lighting assembly is a layered structure including a first adhesive layer for adhering the lighting device to the associated surface; a first polymer layer arranged over the first adhesive layer; a layered electroluminescent light source arranged over the first polymer layer, the electroluminescent light source emitting light when activated; a power source that operates to provide power to activate the electroluminescent light source, the power source being arranged over the first polymer layer and in electrical communication with the electroluminescent light source; a second adhesive layer arranged over the electroluminescent light source; and a second polymer layer arranged over the second adhesive layer. The second adhesive layer adheres the second polymer layer to the electroluminescent light source. Light emitted from the electroluminescent light source is visible through the second adhesive layer and the second polymer layer. The power source includes a battery, a wireless power receiver, or combinations thereof, and the battery is a flexible sheet-like structure. When the assembly is applied to the associated surface, the assembly conforms to contours of the associated surface.

According to another aspect, a method of making a flexible lighting assembly in the form of a sheet-like layered structure includes providing a first polymer layer; arranging an electroluminescent light source over the first polymer layer, the electroluminescent light source emitting light when activated; arranging a power source over the first polymer layer and electrically connecting the power source to the electroluminescent light source to provide power to activate the electroluminescent light source, the power source including a sheet-like battery, a wireless power receiver, or combinations thereof; applying a first adhesive layer under the first polymer layer on a side of the first polymer layer opposite from the electroluminescent light source; and arranging a second polymer layer over the electroluminescent light source and adhering the second polymer layer to the electroluminescent light source with a second adhesive layer. Light emitted from the electroluminescent light source is visible through the second polymer layer.

According to another aspect, a method of providing lighting includes providing a flexible layered lighting assembly including a first adhesive layer; a first polymer layer over the first adhesive layer; an electroluminescent light source arranged over the first polymer layer, the electroluminescent light source emitting light when activated; a power source arranged over the first polymer layer and electrically connected to the electroluminescent light source to provide power to activate the electroluminescent light source, the power source including a battery, a wireless power receiver, or combinations thereof; and a second polymer layer arranged over the electroluminescent light source, wherein light emitted by the electroluminescent light source is visible through the second polymer layer. The lighting assembly is adhered to a surface by contacting the first adhesive layer to the surface. The electroluminescent light source is activated to emit light.

DETAILED DESCRIPTION

Referring to the attached drawings, a flexible lighting assembly 2 is provided for applying to an associated surface 4 to provide lighting, e.g. lighting for an associated vehicle 6. The lighting assembly 2 is a sheet-like layered structure, and each layer within the lighting assembly 2 may be flexible unless otherwise stated herein. The lighting assembly 2 includes a layered electroluminescent (EL) light source 8 positioned between a first polymer layer 10 (i.e. an inner polymer layer) and a second polymer layer 12 (i.e. an outer polymer layer) that is transparent. The assembly 2 includes an on-board power source 14 arranged between the polymer layers 10, 12 for powering the EL light source 8. Accordingly, the lighting assembly 2 is wirelessly powered and does not require wiring to a separate power source (e.g. a power source of the vehicle 6, such as to the vehicle's battery or alternator). The EL light source 8 emits light when activated by power from the power source 14, and such emitted light is transmitted through the outer polymer layer 12 and is visible from a top side 16 of the lighting assembly 2. The assembly 2 may include various adhesive layers 22, 24 for adhering the various other layers together and includes a first adhesive layer 18 for adhering the lighting assembly 2 to a surface 4, e.g. a surface 4 of the vehicle 6.

Figure 2:
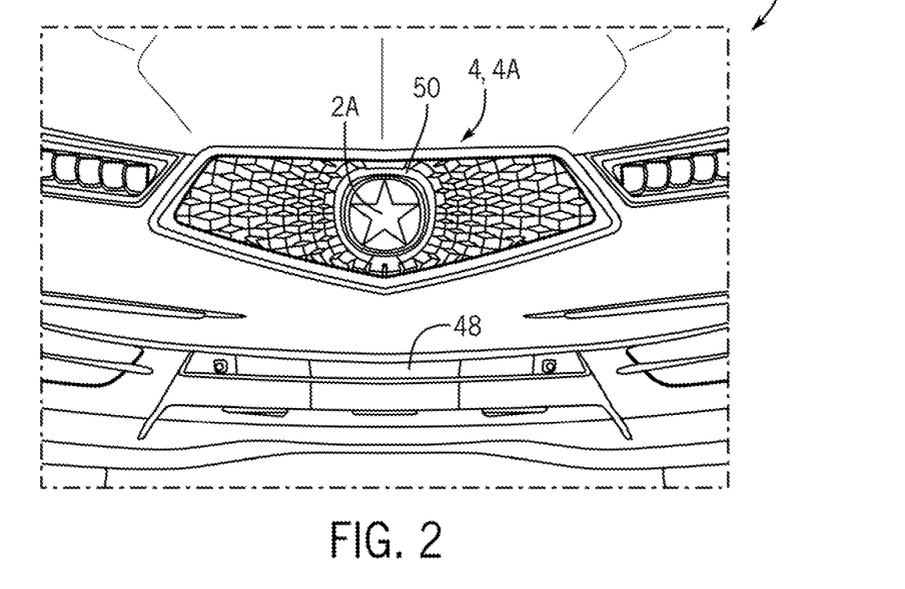
FIG. 2 is a front view of a lighting assembly applied to a vehicle exterior according to the present subject matter.
Figure 3:
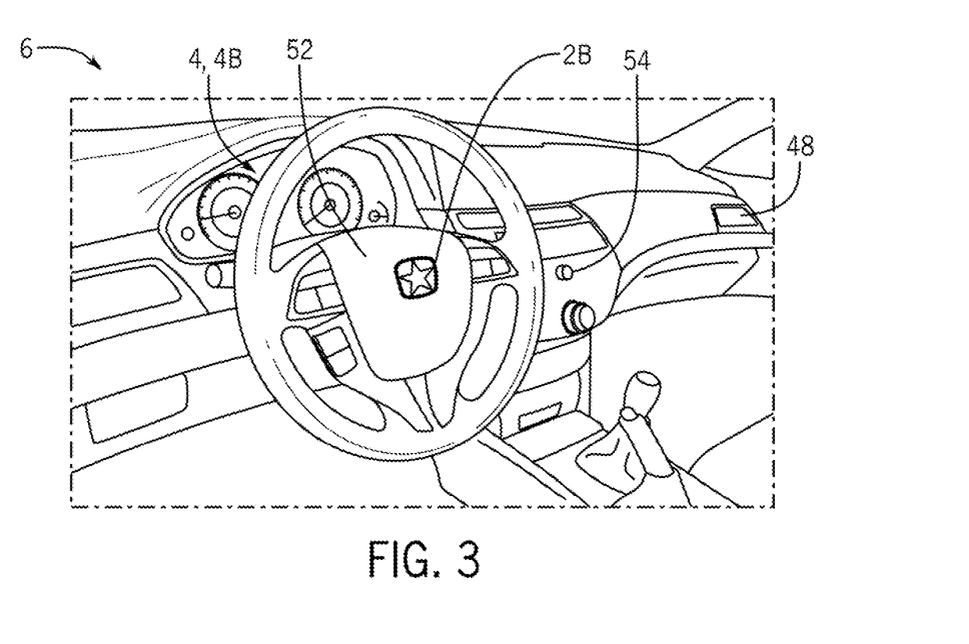
FIG. 3 is a perspective view another lighting assembly applied to a vehicle interior according to the present subject matter.

This self-contained system, including the first adhesive layer 18, allows the lighting assembly 2 to be applied on almost any surface 4, including anywhere on the vehicle 6 at any time including during or after production of the vehicle 6. The vehicle 6 is not particularly limited, and can include any type of transportation mechanism, such as cars, boats, trains, planes, bikes, scooters, etc. As seen in FIG. 2 for example, a lighting assembly 2A in the form of a star is applied to an exterior surface 4A of the vehicle 6, the exterior surface 4A being a grill 50 of the vehicle 6. As seen in FIG. 3, a lighting assembly 2B also in the form of a star is applied to an interior surface 4B of the vehicle 6, the interior surface 4B being a steering wheel 52 of the vehicle 6. The present subject matter is not limited to these embodiments, and other shapes and sizes can be used for the lighting assembly 2 and the lighting assembly 2 can be applied to other exterior and interior surfaces of the vehicle 6 or other surfaces not associated with a vehicle 6. The surface 4 may include any surface upon which the lighting assembly 2 can be applied and near a desired area to be lighted. Non-limiting examples of the surface 4 to which the lighting assembly 2 can be applied include surfaces of personal items including mobile phones, laptops, or other electronic devices, backpacks, or clothing; a person's skin; household items including furniture, steps, or walls and ceilings to act as a nightlight; outdoor items including business signs, address numbers, or park benches; etc. Therefore, the lighting assembly 2 can be used to customize the lighting of an area, e.g. an area of the vehicle 6 or areas at other locations, for example by supplementing an existing lighting system of that area or by being the only lighting for that area. The invention provides a prepackaged lighting assembly 2 that can be applied on almost any interior or exterior surface 4, and without the need to provide a dedicated housing and wire harness for the lighting assembly 2. The invention will be further explained in relation to application on a surface 4 of a vehicle 6, although the invention is not limited to such use.

Figure 1:
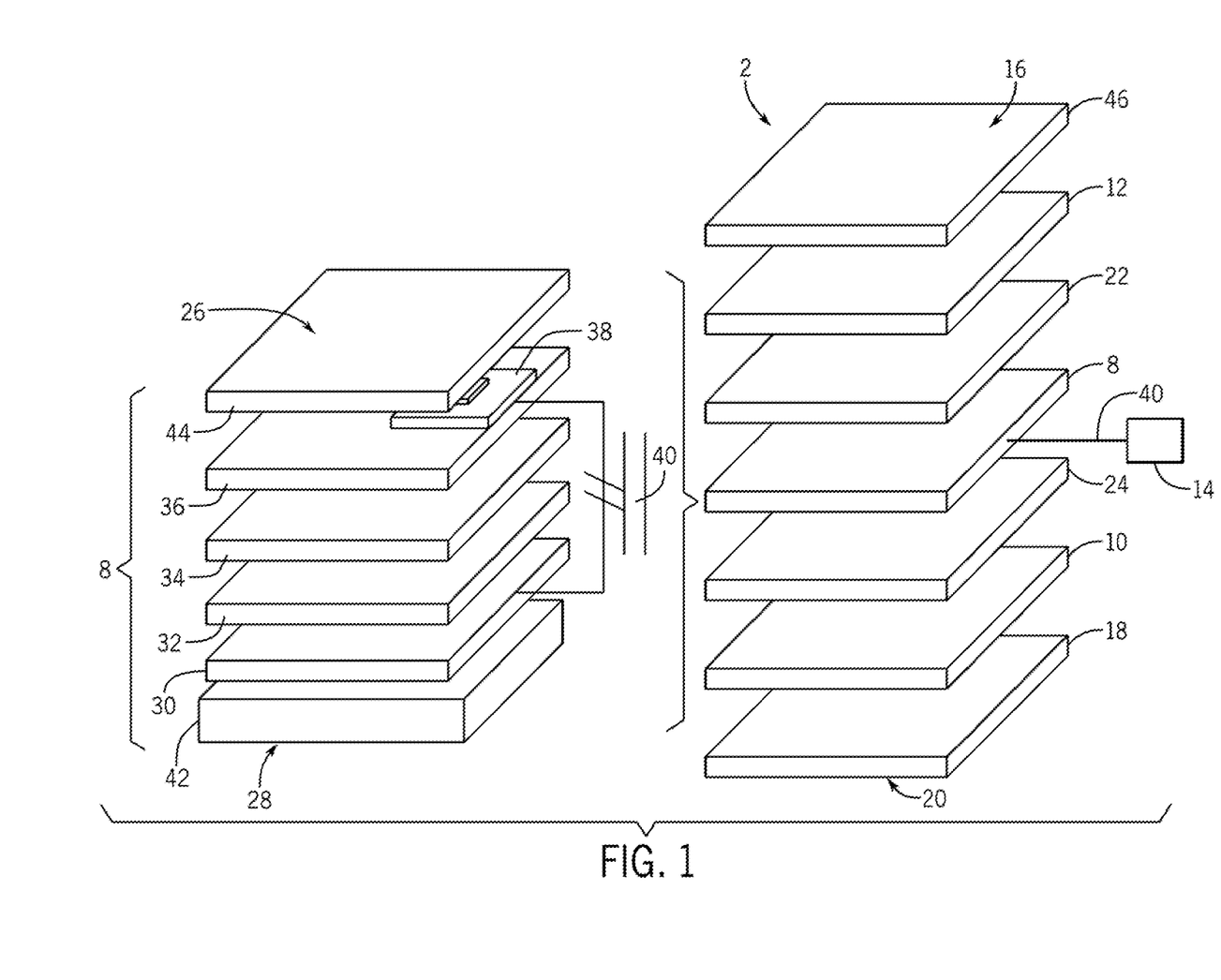
FIG. 1 is a schematic exploded perspective view of a lighting assembly according to the present subject matter.

As used herein, "top," "above," "over," "covers," and similar expressions refers to a direction or position that is up in the FIG. 1 and relatively nearer to the top side 16, which may be exposed or visible when the lighting assembly 2 is applied to the surface 4; while "bottom," "below," "under," "is covered by," and similar expressions is an opposite direction or position that is down in FIG. 1 and relatively nearer to a bottom side 20 of the lighting assembly 2, which is facing the surface 4 to which the lighting assembly 2 is affixed.

The lighting assembly 2 can be included in a variety of shapes, sizes, configurations, and at a plurality of locations on the vehicle 6, and is shown in FIGS. 2-3 to be in the shape of a star. The lighting assembly 2 is not limited to this shape, and can have other shapes. Because the lighting assembly 2 is flexible, it can conform to the contours and shape of the surface 4 to which it is adhered, which may include complex curves.

As shown in FIG. 2, the lighting assembly 2A can be applied to an exterior surface 4A of the vehicle 6 to provide illumination at the exterior of the vehicle 6. As shown in FIG. 3, the lighting assembly 2B can be applied to an interior surface 4B of the vehicle 6 to provide illumination at the interior of the vehicle 6.

Activation of the lighting assembly 2 to emit light may be paired to certain operations of the vehicle 6, such as when an engine of the vehicle 6 is running, or during powered movement of the vehicle 6, for example. If multiple lighting assemblies 2 are provided in a single vehicle 6, these may be separately or jointly activatable.

1. Polymer Layers

The inner and outer polymer layers 10, 12 are flexible sheets of polymer material, and the two polymer layers 10, 12 may comprise the same or different polymer materials. The inner and outer polymer layers 10, 12 provide structure for the other components of the lighting assembly 2, and may protect the other components from degradation due to UV radiation, moisture, abrasions, etc.

The outer polymer layer 12 allows light emitted from the EL light source to pass therethrough so that the emitted light is visible from top side 16 of the assembly 2. For this purpose, the outer polymer layer 12 may be transparent or translucent. The inner polymer layer 10 may be transparent, translucent, or opaque.

The material used to make the polymer layers 10, 12 are not particularly limited, and may include but is not limited to vinyl polymers, urethane polymers, polyvinylidene difluoride (PVDF), polypropylene, acrylate polymers, or combinations thereof. These materials may be formed into films and cut to appropriate size for the desired application. The polymer layers 10, 12 may have the same or different thicknesses, which are not limited but for example may range from 10-150 μm. The inner and outer polymer layers 10, 12 may be coextensive and bonded to each other around their peripheries (e.g. with an adhesive) to seal in the other components of the lighting assembly 2. Alternatively, the inner and outer polymer layers 10, 12 may not be sealed to each other around their peripheries.

In a non-limiting embodiment, the inner and outer polymer layers 10, 12 are vinyl sheets, for example 3M™ Wrap Film Series 1080 available from available from 3M Company of Maplewood, Minn., USA.

2. Electroluminescent Light Source

The EL light source 8 is a thin flexible sheet-like layered structure, and is included between the inner and outer polymer layers 10, 12. The EL light source 8 is activated to emit light by power delivered from the power source 14. The light emitted by the EL light source 8 is transmitted through the outer polymer layer 12 and is visible from the top side 16 of the assembly 2.

The EL light source 8 may define a top 26 and an opposite bottom 28. The top 26 of the EL light source 8 may be arranged closer to (i.e. facing) the top side 16 of the assembly 2 than the bottom 28 (i.e. closer to the outer polymer layer 12); while the bottom 28 may be arranged closer to (i.e. facing) the bottom side 20 of the assembly 2 than the top 26 (i.e. closer to the inner polymer layer 10).

The EL light source 8 includes from the bottom 28 to the top 26, a first electrode layer 30, a dielectric layer 32 over the first electrode layer 30, a phosphor layer 34 over the dielectric layer 32, a second electrode layer 36 over the phosphor layer 34, a bus bar 38 in electrical contact with the second electrode layer 36, and a conductive lead 40 providing an electrical connection between the power source 14 and the EL light source 8. The EL light source 8 may also include a flexible substrate layer 42 under the first electrode layer 30 and upon which the other layers of the EL light source 8 are formed; and a cover layer 44 over the second electrode layer 36.

Although depicted as a single layer, the cover layer 44 may be one or more top layers provided as a flexible transparent covering that provides protection to each of the layers of the EL light source 8. The cover layer 44, including one or more top layers, can have a total thickness of 25-125 μm for example, and is transparent or translucent.

The flexible second electrode layer 36 is provided under the cover layer 44. The second electrode layer 36 may be a film coating layer that is both electrically conductive, and transparent or translucent. The second electrode layer 36 may comprise such materials as, without limitation, conductive polymers (PEDOT), carbon nanotubes (CNT), antimony tin oxide (ATO) and indium tin oxide (ITO). An illustrative commercial product is CLEVIOS™ conductive, transparent and flexible polymers (available from Heraeus Clevios GmbH of Leverkusen, Germany) diluted in isopropyl alcohol as a thinner/drying agent. CLEVIOS™ conductive polymers exhibit relatively high efficacy. In addition, CLEVIOS™ conductive polymers are based on a styrene co-polymer and thus provides a ready mechanism for chemical crosslinking/mechanical bonding with the underlying phosphor layer 34. In a non-limiting example, the second electrode layer 36 has a thickness of 1-25 μm.

The bus bar 38 is interposed between the cover layer 44 and the second electrode layer 36. The bus bar 38 may be flexible and provided as a relatively low-impedance strip of conductive material, usually comprised of one or more of the materials usable to produce the first electrode layer 30. In an illustrative example, the bus bar 38 includes of silver. The bus bar 38 is typically applied to the peripheral edge of the lit field, i.e. the peripheral edge of the second electrode layer 36. Although the bus bar 38 is generally shown as being arranged on top of the second electrode layer 36 in the figures, the bus bar 38 may be applied below the second electrode layer 36, or adjacent to the second electrode layer 36.

Under the second electrode layer 36, a flexible phosphor layer 34 is provided to generate the emitted light, which is emitted toward the top 26 of the EL light source 8 and through the second electrode layer 36, and through cover layer 44 if present to be visible at the top 26 of the EL light source 8. The phosphor layer 34 is a semi-conductive flexible film coating layer including a material (such as metal-doped Zinc Sulfide (ZnS)) encapsulated within an electrostatically permeable polymer matrix. When excited by the presence of an alternating electrostatic field generated by an AC signal, the doped ZnS absorbs energy from the field, which it in turn re-emits as a visible-light photon upon returning to its ground state. In a non-limiting example, the phosphor layer 34 is formed using a material including about a 2:1 solution of co-polymer and dilute ammonium hydroxide. To this solution, a quantity of metal-doped ZnS based phosphors doped with at least one of copper, manganese and silver (i.e., ZnS:Cu, Mn, Ag, etc.) pre-wetted in a dilute ammonium hydroxide is added to form a supersaturated suspension. In a non-limiting example, the phosphor layer 34 has a thickness of 30-100 μm.

Below the phosphor layer 34, a flexible dielectric layer 32 is provided that electrically insulates the phosphor layer 34. The dielectric layer 32 may be an electrically non-conductive film coating layer including a material (typically Barium Titanate—$BaTiO_3$) possessing high dielectric constant properties encapsulated within an insulating polymer matrix having relatively high permittivity characteristics (i.e., an index of a given material's ability to transmit an electromagnetic field). In an illustrative example, the dielectric layer 32 is formed using a material including about a 2:1 solution of co-polymer and dilute ammonium hydroxide. To this solution a quantity of $BaTiO_3$, which has been pre-wetted in ammonium hydroxide, may be added to form a supersaturated suspension. In a non-limiting example, the dielectric layer 32 may comprise at least one of a titanate, an oxide, a niobate, an aluminate, a tantalate, and a zirconate material, among others.

Below the dielectric layer 32, a flexible first electrode layer 30 is provided that is electrically connected to the conductive lead 40, which in turn is connected to the power source 14 to thereby provide power to the EL light source 8 for illumination thereof. The conductive lead 40 may comprise any of the materials that may be used for the second electrode layer 36 or the first electrode layer 30.

The first electrode layer 30 is a film coating layer that may be formed using a printable electrically conductive material. Once formed, the first electrode layer 30 may define the rough outline of the lit field of the EL light source 8. In a non-limiting example, the first electrode layer 30 may be made using a highly conductive, generally opaque material. Examples of such materials include, without limitation, an alcohol/latex-based, silver-laden solution such as SILVASPRAY™ available from Caswell, Inc. of Lyons N.Y., and a water-based latex, copper-laden solution such as "Caswell Copper" copper conductive paint, also available from Caswell, Inc., and mixtures thereof.

In a non-limiting example, the first electrode layer 30 may be a metal plating where a suitable conductive metal material is applied to the non-conductive substrate layer 42 using any suitable process for the select metal plating. Example types of metal plating include, without limitation, electroless plating, vacuum metalizing, vapor deposition and sputtering. In one embodiment, the first electrode layer 30 is formed on the inner polymer layer 10, which acts as the substrate layer 42 for the EL light source 8. Thereafter, other layers are formed over the first electrode layer 30 to form the EL light source 8. In another embodiment, the first electrode layer 30 is formed on the substrate layer 42, which is separate from the inner polymer layer 10, with subsequent layers being formed thereon to provide the EL light source 8. After formation, the EL light source 8 is then arranged between the inner and outer polymer layers 10, 12.

A primer layer (not shown) may be positioned between the first electrode layer 30 and the substrate layer 42 or the inner polymer layer 10 acting as the substrate layer 42. The primer layer may be oxide-based and may serve to electrically insulate the subsequent conductive and semi-conductive layers from the substrate layer 42, and/or may also promote adhesion between the substrate layer 42 and subsequently applied layers. Illustrative examples include polyurethane coatings such as single or two-component polyurethane systems. The substrate layer 42 may be a flexible sheet, and may comprise a polymer sheet for example.

The methods used to form the various layers of the EL light source 8 are not particularly limited, and each layer can be formed by applying a curable liquid composition/mixture to form a liquid film on an underlying layer, and then curing the film to for a cured solid layer of the EL light source 8. Methods of applying/forming the various layers of the EL light source 8 are not particularly limited, and can include spraying, screen printing, digital printing, or the like, and combination thereof. After application of the material for forming the layers, the curable liquid composition may be cured by UV curing, heat curing, moisture curing, drying, a chemical reaction, or other known curing methods and combinations thereof. Except as otherwise noted herein, curable liquid compositions used to form the various layers of the EL light source 8 may be those conventionally used in the art.

The various layers of the EL light source 8 may be formed on the substrate layer 42. The thickness of the various layers of the EL light source 8 are not particularly limited, and can range from about 1-125 μm or 20-100 μm. In one embodiment, the curable liquid compositions used to form the layers of the EL light source 8 are sprayed directly on an underlying solidified layer, e.g. the substrate layer 42 or an underlying cured layer of the EL light source 8, and then itself cured thereon before another subsequent layer is formed.

In one non-limiting example, the first electrode layer 30 may be formed on the substrate layer 42, optionally using an interlaying primer coating (not shown) to promote adhesion between the two. The first electrode layer 30 may be formed by spaying a suitable curable liquid composition to thereby form a sprayed film layer on the substrate layer 42, and then curing the sprayed film to form the first electrode layer 30 on the substrate layer 42. The phosphor layer 34 may then be formed in a similar manner, by spaying a suitable curable liquid composition directly on the cured first electrode layer 30 to form a sprayed film layer. The sprayed film layer is then cured to form the phosphor layer 34 on the first electrode layer 30. Subsequent layers, such as the dielectric layer 32 and second electrode layer 36, may be formed in a similar manner by applying a suitable curable liquid material directly on a preceding cured layer.

In the present invention, the chemical compositions and structure of the substrate layer 42, primer layer, first electrode layer 30, and the bus bar 38 are not particularly limited, and may comprise suitable formulations and thicknesses as known in the art.

Although the present subject matter is described in terms of an electroluminescent light source emitting light, it will be understood that the illumination mechanism is not limited in any way. Illustrative examples include a light emitting diode and an organic light-emitting diode configured in a film or sheet that is positionable on the substrate layer 42.

In a non-limiting example, the EL light source 8 may be in the form of electroluminescent lamps disclosed in U.S. Pat. No. 8,470,388, the contents of which is incorporated by reference herein.

3. Graphic Layer

The lighting assembly may include flexible graphic layer 46 arranged on the outer polymer layer 12. The graphic layer 46 include one or more coatings arranged on a top of the outer polymer layer 12 as shown in FIG. 1, or on a bottom of the outer polymer layer 12. Wen arranged on the bottom of the outer polymer layer 12, the graphic layer 46 may be protected from degradation, for example from abrasion, by the outer polymer layer 12. The graphic layer 46 may be a continuous layer and may be coextensive with the outer polymer layer 12 as shown in FIG. 1, or it may be formed from discrete and discontinuous portions. The graphic layer 46 may be formed from one or more layers of a printed ink, and/or of a colored film. The graphic layer 46 may include any indicia, styling, coloring, pattern, etc., so as to provide aesthetics to the lighting assembly 2. The graphics may be transparent (colored or not), translucent, or opaque. If translucent, the graphic layer 46 may present an opaque appearance ("dead face") when the EL light source 8 is not emitting light, and but may allow at least some of the emitted light to be transmitted therethrough when the EL light source 8 is activated so as to be visible at the top side 16 of the lighting assembly 2. If opaque, the graphic layer 46 may not occupy the entire area of the top side 16 of the lighting assembly 2 and instead may only occupy discrete portions of the top side 16 so as to allow the emitted light from the EL light source 8 to be visible at the top side 16. An opaque graphic layer 46 may thereby present indicia over a portion of the area of the outer polymer layer 12, and such indicia may be back-lit by the emitted light from the EL light source 8. The opaque graphic layer 46 may also obstruct a portion of the other layers of the lighting assembly 2 from view, such as for example, if the opaque graphic layer 46 were arranged as an opaque border around the perimeter of the outer polymer layer 12.

The graphic layer 46 may include an ink, polymer, textile, composite material, enamel, paper, glass, metal, ceramic, other material, and combinations thereof. In one non-limiting example, the graphic layer 46 includes a pigmented ink including, for example, a mixture of polymer and pigment particles. The polymer may be an acrylic, urethane, or other resin. The graphic layer 46 may be formed by applying the ink as a liquid to the outer polymer layer 12, and curing the polymer in the ink to produce the graphic layer 46. The graphic layer 46 may have a pigment loading and/or thickness sufficient to inhibit the emitted light from the EL light source 8 to be transmitted through the graphic layer 46. Alternatively, the graphic layer 46 may be sufficiently transparent or translucent, as opposed to being opaque, such that light emitted by the EL light source 8 can be seen through the graphic layer 46. In one non-limiting embodiment, the graphic layer 46 has a thickness on the outer polymer layer 12 from 1-50 µm, 2-40 µm, or 10-20 µm.

If the graphic layer 46 is arranged on top of the outer polymer layer 12, then the graphic layer 46 may define the top side 16 of the lighting assembly 2; otherwise the outer polymer layer 12 may define the top side 16. In any event, the top side 16 of the lighting assembly 2 is facing away from the surface 4 when the lighting assembly 2 is adhered thereto.

4. Adhesive Layers

The adhesive layers 18, 22, 24 of the lighting assembly 2 are flexible. The first adhesive layer 18 is included on a side of the inner polymer layer 10 opposite from the EL light source 8 so as to allow the lighting assembly 2 to be adhered to a surface 4. The first adhesive layer 18 may be a removable adhesive or a permanent adhesive. As used herein, "removable adhesive" means an adhesive that allows adhesion of the lighting assembly 2 to the surface 4, and then also allows subsequent intentional removal of the lighting assembly 2 from the surface 4 without structural or functional damage to the lighting assembly 2. In this embodiment, the lighting assembly 2 may be repositionable, and thus may be subsequently removed from the surface, and adhered to a surface 4 at another location, for example to a different surface than originally adhered. As used herein, "permanent adhesive" means an adhesive that allows adhesive of the lighting assembly 2 to the surface 4, and then does not allow subsequent intentional removal of the lighting assembly 2 from the surface 4 without structural or functional damage to the lighting assembly 2. In this embodiment, the lighting assembly 2 is not repositionable.

The first adhesive layer 18 may be transparent or opaque since it is arranged under the EL light source 8 and may not need to allow emitted light to be transmitted therethrough. The first adhesive layer 18 may define the bottom side 20 of the lighting assembly 2 and may face the surface 4 when the lighting assembly 2 is adhered thereto.

The second adhesive layer 22 is included to adhesively bond the EL light source 8 to the outer polymer layer 12 or graphic layer 46 as the case may be. The second adhesive layer 22 may be a permanent adhesive, and is transparent to the emitted light from the EL light source 8 so that the emitted light may be transmitted through the second adhesive layer 22 and be visible at the top side 16 of the lighting assembly 2.

The third adhesive layer 24 may be included if the EL light source 8 is separate formed on a substrate layer 42, and not on the inner polymer layer 10. In this case, the third adhesive layer 24 is included to adhesively bond the EL light source 8 (e.g. the substrate layer 42) to the inner polymer layer 10. The third adhesive layer may be a permanent adhesive and may be transparent or opaque since it is arranged under the EL light source 8 and may not need to allow emitted light to be transmitted therethrough.

5. Power Source

The lighting assembly 2 includes the power source 14, which as part of the lighting assembly 2 is an on-board source of power to activate the EL light source 8 to emit light. The power source 14 is arranged between the inner and outer polymer layers 10, 12 and is in electrical communication with the EL light source 8 through the conductive lead

40. The power source 14 operates to provide power to activate the EL light source 8 so that the EL light source 8 emits light. The power source 8 may also be located remote from the lighting assembly, and may electrically connect to the lighting assembly 2 to provide power to illuminate the EL light source 8 through electrical contacts on the surface 4, which contact corresponding electrical contacts on the lighting assembly 2 to form the conductive lead 40. The electrical contacts on the surface 4 may be energized to provide power to the lighting assembly 2 when a sensing device senses the lighting assembly 2 on the surface 4.

Power used to operate the EL light source 8 to emit light is dependent on the components included in the power source 14. The power source 14 may include a battery, a wireless power receiver, or combinations thereof.

If the lighting assembly 2 includes a battery, the EL light source 8 may derive power directly from the battery. The battery may be a thin flexible sheet-like structure such as a printed battery, or a thin-film battery, and the sheet-like battery could be arranged as a layer under the EL light source 8. Suitable batteries include but are not limited to a printed or thin film lithium-ion battery, such as printed solid state batteries, for example TAeTTOOz® available from Evonik GmbH of Essen, Germany, or lithium ion nanofiber batteries such as model 3X12019 available from Lionrock Batteries of Kowloon, Hong Kong.

If the lighting assembly 2 includes a wireless power receiver, the EL light source 8 may derive power directly from the wireless power receiver. The wireless power receiver may receive a power signal from a wireless power transmitter 48, which can be arranged on or in the vehicle 6 or elsewhere outside the vehicle 6. If the lighting assembly 2 is mounted to a surface 4 not associated with a vehicle 6, then the wireless power transmitter may be mounted in proximity to the lighting assembly 2 sufficiently close to transmit the wireless power signal. For example, if the lighting assembly 2 is mounted to an electronic device like a mobile phone or computer, then the wireless power transmitter may be powered by the electronic device and arranged in the electronic device or in a protective case for the electronic device. If the lighting assembly 2 is included in a vehicle 6, then the vehicle 6 may include one or more wireless power transmitters 48 arranged in various locations relative to the vehicle 6 and relative to the lighting assembly 2 so as to supply a sufficient power signal to the wireless power receiver to activate the EL light source 8 to emit light. In FIG. 2, the wireless power transmitters 48 is arranged near a front of the vehicle 6. However, the wireless power transmitters 48 may be arranged at other exterior locations on the vehicle 6. In FIG. 3, the wireless power transmitters 48 is arranged at a dashboard of the vehicle 6. However, the wireless power transmitters 48 may be arranged at other interior locations in the vehicle 6. The wireless power receiver may convert the power signal (e.g. radio waves or other electromagnetic radiation) transmitted by the wireless power transmitters 48 into DC power for powering the EL light source 8. The wireless power receiver may receive near-field or far-field power signals from the wireless power transmitters 48. The wireless power receiver may be flexible, such as a flexible printed receiver coil formed from a conductive ink. If not flexible, the wireless power receiver may be sized to be small enough so as to nevertheless allow for flexibility of the overall structure of the lighting assembly 2. Suitable wireless power receivers include the INDRA chip from Nikola Labs of Westerville, Ohio. The wireless power transmitter 48 can be positioned remotely on another portion of the vehicle where a wire harness is conventionally available. The wireless power receiver may work over a wide range of frequencies, e.g. 300 MHz to 6 GHz, and may provide a regulated 3.3 V DC output to power the EL light source 8.

If the power source 14 includes a battery and a wireless power receiver, the battery may provide power directly to the EL light source 8, and be rechargeable by power provided by the wireless power receiver. Thus, the wireless power receiver provides power indirectly to the EL light source 8 through recharging the battery.

By these arrangements including the on-board power source 14, the lighting assembly 2 can be arranged anywhere in the interior or exterior of the vehicle 6 to provide lighting for the vehicle 6. The on-board power source 14 may eliminate the need for a wired electrical connection between the lighting assembly 2 and an external power source, such as a battery or alternator of the vehicle 6. As such, the lighting assembly 2 is a stand-alone assembly that does not require a wired electrical connection to the vehicle 6, and can thus be arranged anywhere on the vehicle 6 as an after-market addition to the vehicle 6. This presents a clean and self-contained lighting assembly 2 allowing for easy placement and optional repositioning of the lighting assembly 2 as desired, without having to worry about providing a wired electrical connection for the lighting assembly 2.

6. Activation

The lighting assembly 2 may be activated so that the power source 14 provides power to illuminate the El light source 8. Such supply of power from the power source 14 to the EL light source 8 may be initiated by operation of a switch 54 in the vehicle 6 that causes the wireless power transmitter 48 to transmit the power signal to the wireless power receiver. The supply of power can also be accomplished by the wireless power transmitter 48 automatically operating to send the power signal to the wireless power receiver when the vehicle 6 is operated, e.g. when the headlights are turned on. The supply of power can also be accomplished by operation of a switch. The switch can be a capacitive switch operated by touch and arranged within the layers of the lighting assembly 2 for making and breaking an electrical connection between the battery and the EL light source 8. The switch can also be a Hall effect switch arranged within the layers of the lighting assembly 2 and triggered by operation of an electromagnet in the vehicle 6. The electromagnet may itself be operated by a switch 54 in the vehicle 6. The lighting assembly 2 may also be controlled using a remote control or by blue tooth.

7. Methods

Figure 4:
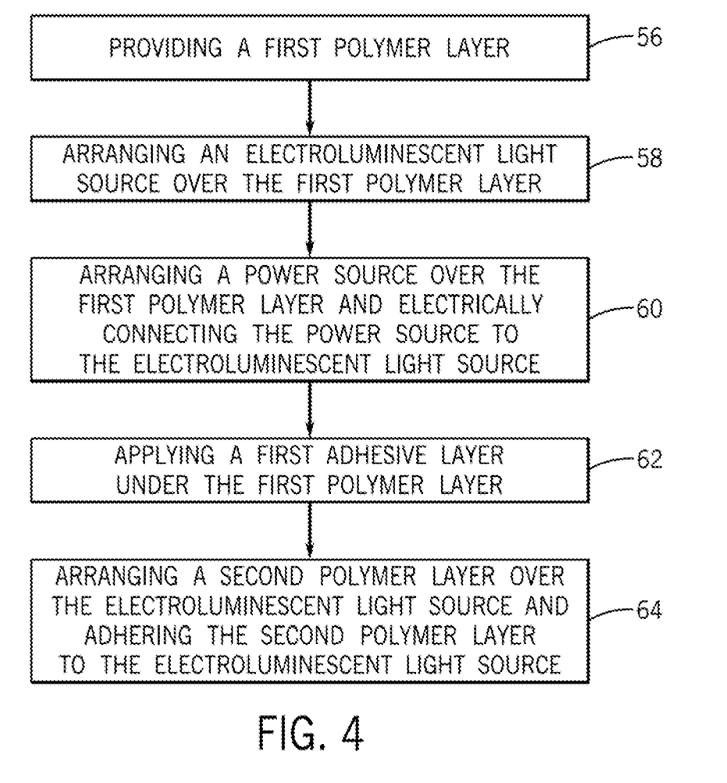
FIG. 4 is a schematic block diagram illustrating a method according to the present subject matter.

With reference to FIG. 4 a schematic block diagram illustrating a method of making a flexible vehicle lighting assembly 2 is shown. In the method, at 56, a first polymer layer 10 is provided. At 58, an EL light source 8 is arranged over the first polymer layer 10. The EL light source 8 emits light when activated. At 60, a power source 14 is arranged over the first polymer layer 10 and is electrically connected to the EL light source 8 to provide power to activate the EL light source 8. The power source 14 can include a battery, a wireless power receiver, or combinations thereof. At 62, a second polymer layer 12 is arranged over the EL light source 8 and is adhered to the EL light source 8 with a second adhesive layer 22. At 64, a first adhesive layer 18 is arranged under the first polymer layer 10 on a side of the first polymer layer 10 opposite from the EL light source 8. When the power source 14 provides power to the EL light source 8, the EL light source 8 emits light. Light emitted from the EL light source 8 is visible through the second polymer layer 12. When the lighting assembly 2 is adhered via the first adhesive layer 18 to an associated surface 4, the lighting assembly 2 conforms to contours of the associated surface 4.

Figure 5:
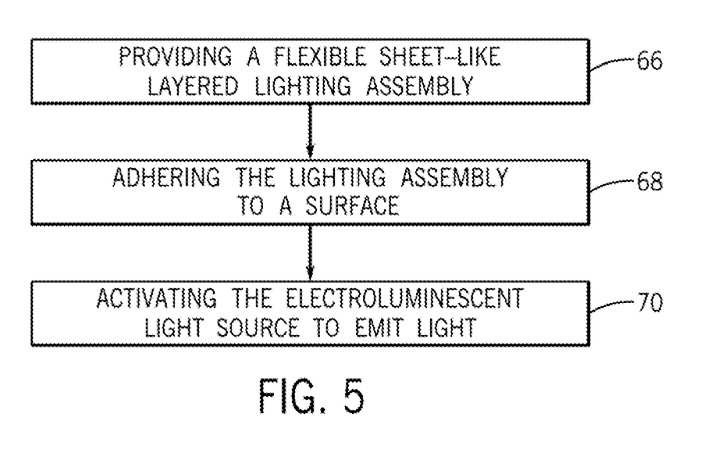
FIG. 5 is a schematic block diagram illustrating another method according to the present subject matter.

With reference to FIG. 5 a schematic block diagram illustrating a method of lighting a vehicle 6 is depicted. In the method at 66, a flexible layered lighting assembly 2 is provided. The lighting assembly 2 includes a first adhesive layer 18 and a first polymer layer 10 over the first adhesive layer 18. The lighting assembly 2 includes an EL light source 8 that emits light when activated and is arranged over the first polymer layer 10. The lighting assembly 2 includes a power source 14 arranged over the first polymer layer 10 and electrically connected to the EL light source 8 to provide power to activate the EL light source 8. The power source 14 including a battery, a wireless power receiver, or combinations thereof. The lighting assembly 2 includes a second polymer layer 12 arranged over the EL light source 8. Light emitted by the EL light source 8 is visible through the second polymer layer 12. At 68, the lighting assembly 2 is adhered to a surface 4 (e.g. of the vehicle 6) by contacting the first adhesive layer 18 to the surface 4. At 70, the EL light source 8 is activated to emit light, and when applied to the vehicle 6, thereby lighting the vehicle 6.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A flexible lighting assembly for applying to an associated surface, the lighting assembly being a layered structure and comprising:
   a first adhesive layer for adhering the lighting assembly to the associated surface;
   a first polymer layer arranged over the first adhesive layer;
   a layered electroluminescent light source arranged over the first polymer layer, the electroluminescent light source emitting light when activated;
   a power source that operates to provide power to activate the electroluminescent light source, the power source being arranged over the first polymer layer and in electrical communication with the electroluminescent light source;
   a second adhesive layer arranged over the electroluminescent light source; and
   a second polymer layer arranged over the second adhesive layer;
   wherein the second adhesive layer adheres the second polymer layer to the electroluminescent light source;
   wherein light emitted from the electroluminescent light source is visible through the second adhesive layer and the second polymer layer;
   wherein the power source includes a battery, a wireless power receiver, or combinations thereof, and the battery is a flexible sheet-like structure; and
   wherein when the assembly is applied to the associated surface, the assembly conforms to contours of the associated surface.

2. The lighting assembly according to claim 1, further including a graphic layer arranged on the second polymer layer, wherein the graphic layer is visible from a top side of the lighting assembly.

3. The lighting assembly according to claim 1, wherein:
   the electroluminescent light source is a flexible sheet-like layered structure and includes a top, and a bottom opposite from the top;
   the bottom is arranged closest to the first polymer layer;
   the electroluminescent light source includes the following layers from the bottom to the top:
      a first electrode layer;
      a dielectric layer over the first electrode;
      a phosphor layer over the dielectric layer, the phosphor layer emitting light when supplied with power from the power source;
      a second electrode layer over the phosphor layer;
      a bus bar in electrical contact with the second electrode layer; and
      a conductive lead providing an electrical connection between the power source and the electroluminescent light source;
   light emitted by the phosphor layer is transmitted through the second electrode and through the second polymer layer.

4. The lighting assembly according to claim 3, wherein:
   the electroluminescent light source includes a substrate layer upon which the first electrode is arranged; and
   the substrate layer is adhered to the first polymer layer by a third adhesive layer arranged between the substrate layer and the first polymer layer.

5. The lighting assembly according to claim 1, wherein the lighting assembly is a vehicle lighting assembly for applying to an associated interior or exterior vehicle surface.

6. The lighting assembly according to claim 1, wherein the power source includes the wireless power receiver and the battery, and the wireless power receiver operates to recharge the battery.

7. The lighting assembly according to claim 1, wherein:
   the power source includes the wireless power receiver; and
   the wireless power receiver operates to provide power directly to the electroluminescent light source.

8. A method of providing lighting, comprising:
   providing a flexible sheet-like layered lighting assembly including:
      a first adhesive layer;
      a first polymer layer over the first adhesive layer;
      an electroluminescent light source arranged over the first polymer layer, the electroluminescent light source emitting light when activated;
      a power source arranged over the first polymer layer and electrically connected to the electroluminescent light source to provide power to activate the electroluminescent light source, the power source including a sheet-like battery, a wireless power receiver, or combinations thereof; and
      a second polymer layer arranged over the electroluminescent light source, wherein light emitted by the electroluminescent light source is visible through the second polymer layer;
   adhering the lighting assembly to a surface by contacting the first adhesive layer to the surface; and
   activating the electroluminescent light source to emit light.

9. The method according to claim 8, wherein the surface includes an interior or exterior surface of a vehicle, and activating the electroluminescent light source to emit light thereby lights the vehicle.

10. The method according to claim 9, further including:
removing the lighting assembly from the surface of the vehicle; and
adhering the lighting assembly on a different surface of the vehicle.

11. The method according to claim 9, wherein the wireless power transmitter is arranged on the vehicle.

12. The method according to claim 8, wherein:
the power source includes the wireless power receiver, and
activating the electroluminescent light source includes operating a wireless power transmitter to transmit electromagnetic radiation to the wireless power receiver.

13. The method according to claim 12, wherein the power source also includes the battery, and the wireless power receiver operates to recharge the battery.

\* \* \* \* \*